Sept. 11, 1923.  
C. E. FORRY  
PEAR PEELING APPARATUS  
Filed April 16, 1923  
1,467,616  
5 Sheets-Sheet 2

Inventor  
C. E. Forry  
By Acker & Totten  
Attorneys.

Sept. 11, 1923.

C. E. FORRY 1,467,616

PEAR PEELING APPARATUS

Filed April 16, 1923

Inventor.
C. E. Forry
By Acheson & Totten
Attorneys.

Sept. 11, 1923.　　　　　　　　　　　　　　　　　　　1,467,616
C. E. FORRY
PEAR PEELING APPARATUS
Filed April 16, 1923　　　5 Sheets-Sheet 4
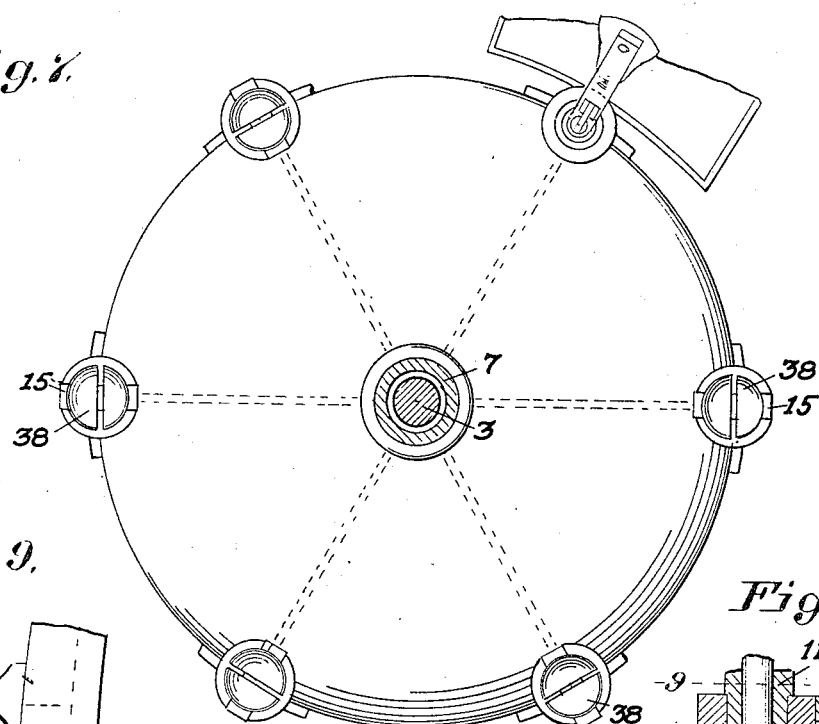
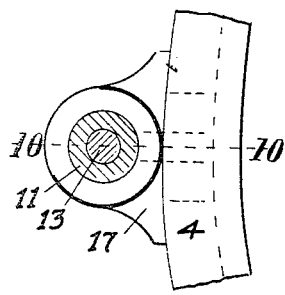
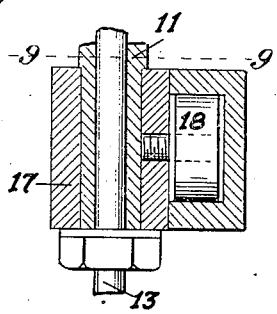
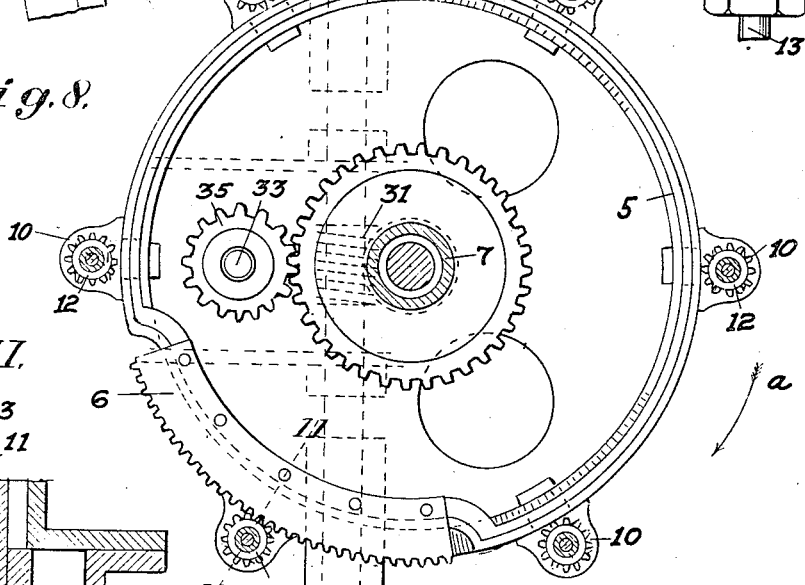
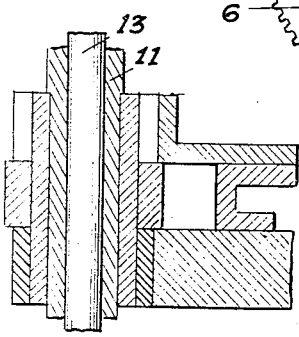

Sept. 11, 1923.  1,467,616
C. E. FORRY
PEAR PEELING APPARATUS
Filed April 16, 1923   5 Sheets-Sheet 5
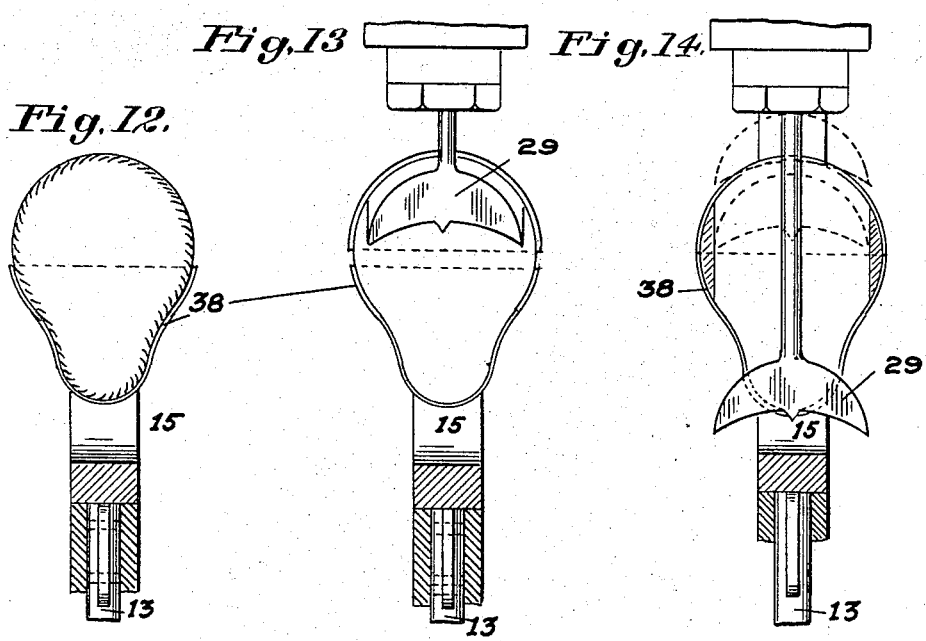
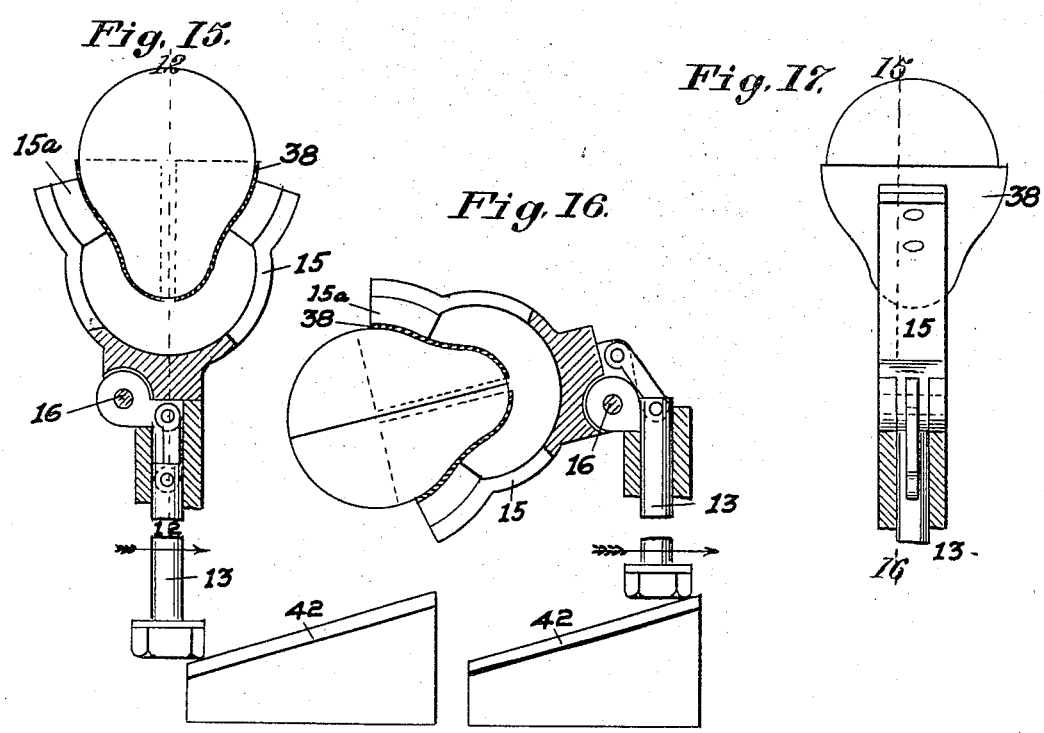
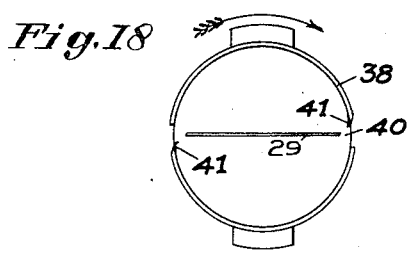

Patented Sept. 11, 1923.

1,467,616

UNITED STATES PATENT OFFICE.

CHARLES E. FORRY, OF OAKLAND, CALIFORNIA, ASSIGNOR OF ONE-THIRD TO E. H. DUNCAN AND ONE-THIRD TO ARTHUR L. DUNCAN, BOTH OF OAKLAND, CALIFORNIA.

PEAR-PEELING APPARATUS.

Application filed April 16, 1923. Serial No. 632,399.

*To all whom it may concern:*

Be it known that I, CHARLES E. FORRY, a citizen of the United States, residing at Oakland, in the county of Alameda and State of California, have invented certain new and useful Improvements in Pear-Peeling Apparatus, of which the following is a specification.

This invention relates to a machine and method of preparing fruit for canning purposes and is particularly adapted to the handling of pears for this purpose.

Previous to my invention herein described, the preparation of pears for canning purposes has been more or less a hand method and consequently more or less inefficient, where a select quality of product has been the aim of production.

Ripe pears are quite delicate and do not permit of rough handling. The meat is soft and juicy and somewhat of a granular consistency. The peeling is thin and inclined to be brittle, so that handling such fruit under ordinary cannery conditions and methods with sometimes inexperienced and indifferent help, it has been quite a serious and difficult problem to handle continuously, large quantities of ripe pears and maintain the highest standard of quality.

The appearance of the fruit in the container has a very large bearing on the grading given by the trade and consumers, so that fruit of uniform size, shape and surface appearance is necessary where the best quality of product is offered.

No matter what the method of handling, the fruit is carefully sorted for size and perfect shape, especially for the select grades of finished product, and as discriminating buyers and users are all familiar with the appearance of a highly graded product, it is desirable and necessary that some method of operation be adopted that will surely maintain such conditions.

The most careful grading and selecting can be easily made to appear like a very inferior product, through the careless and indifferent handling by the peelers and cutters. In any event it is next to impossible to get a large number of operators to all strive toward cutting peelings of a uniform thickness and to carefully maintain the pear shape of the fruit, and if this is not done the most perfect selection of fruit, after peeling, will look like second grade or less.

My invention as described herein and embodied in the structure shown by the accompanying drawings, has for an object the provision of automatic means for receiving individual pears, selected as to size, peeling and shaping said pears through successive stages and then halving them so that each peeled and halved pear is uniform in size, shape and appearance with all other pears passing through the machine. Through this improved method of handling I am enabled to maintain a higher grading of finished product than has been heretofore possible.

Another object of my invention resides in so designing and constructing a machine for the purpose that is very easy to operate, is easily kept clean and sanitary and wherein all operations are in direct view, thus facilitating inspection and attendance and permitting the employment of unskilled labor.

Another and very important object of the invention resides in the method and mechanism wherein each individual fruit is separately held and controlled during the operations of peeling and cutting, without in any manner bruising or abraiding the surface of the fruit, so that each finished product has a very smooth and attractive appearance, notwithstanding the granular nature of the pulp of the pear.

The method forming a part of this invention, whereby this smooth appearance is accomplished is, I think, new in the art of preparing fruit for canning purposes, and is far superior to the methods of peeling fruit wherein caustic lyes, steam or other means or devices are employed for removing the peeling.

With such objects in view, as well as other advantages which may be incident to the use of the improvements, the invention consists in the procedure, and in the parts and combinations thereof hereinafter set forth and claimed, with the understanding that the several necessary elements constituting the same may be varied in proportions and arrangement without departing from the nature of the invention.

In order to make the invention more clearly understood there are shown in the accompanying drawings means for carrying the same into practical effect, without limiting the improvements in their useful applications, to the particular constructions which, for the purpose of explanation, have been made the subject of illustration.

Figure 6:
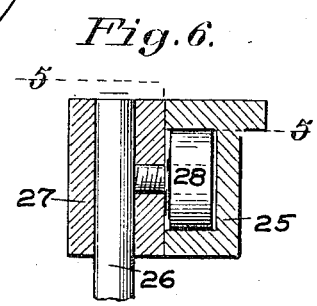
Fig. 6 is a detail of the same cam roller as shown by Fig. 5, taken on line 6—6 of Fig. 5.

Fig. 6ª is a vertical sectional detail of one of the upper spindles and chucks showing its internal structure and arrangement and yielding manner in which this chuck or mould is held.

Figure 2:
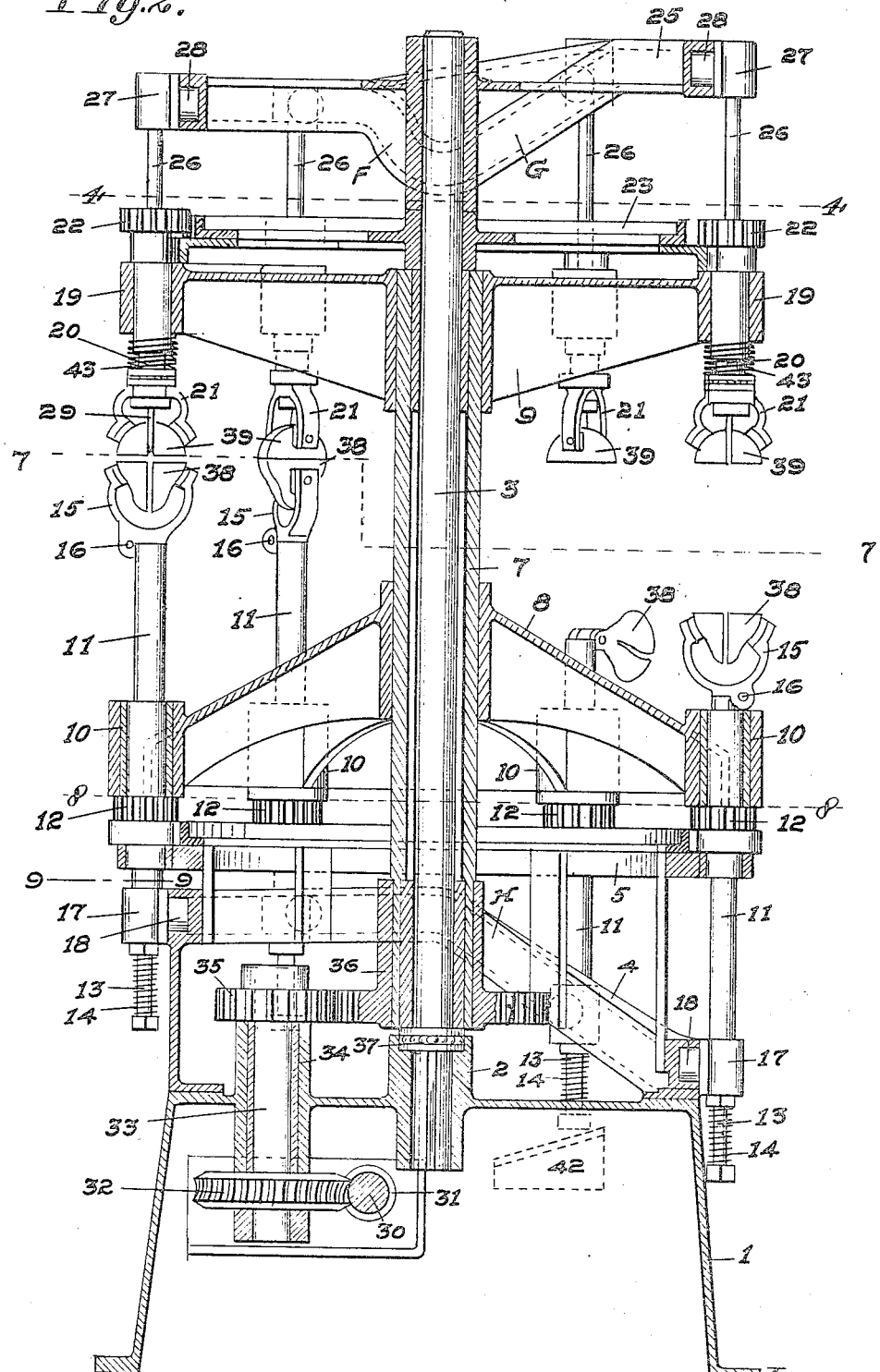
Fig. 2 is a vertical sectional elevation of the machine as shown in Fig. 1 and shows the same parts in approximately the same operative positions, and is taken on line 2—2 of Fig. 3.
Figure 3:
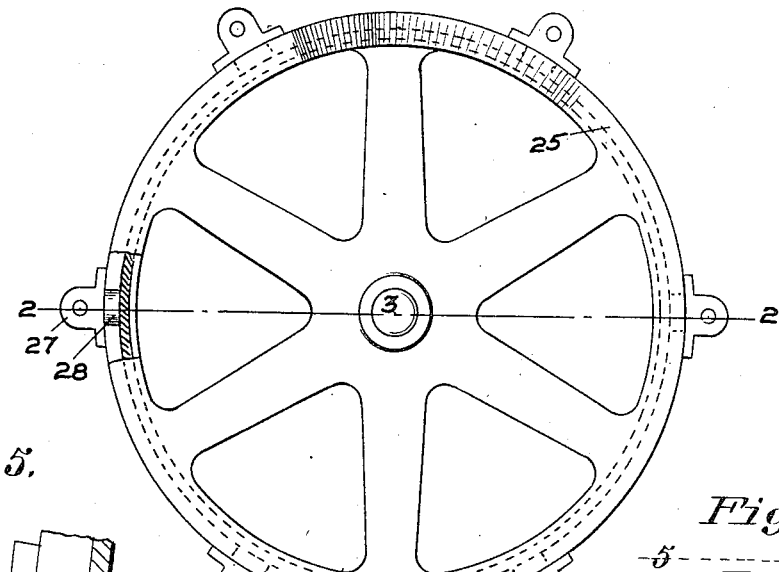
Fig. 3 is a plan of Fig. 1 but showing only the top part of this view and the parts in immediate line with the top.
Figure 5:
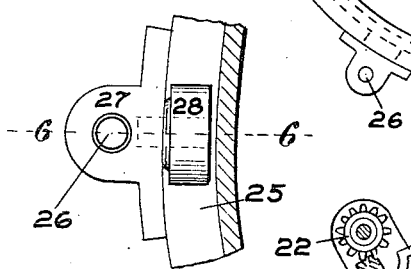
Fig. 5 is a detail illustrating one of the cam rollers controlling the upper chucks for holding the pears during the peeling operation, taken on line 5—5 of Fig. 6.

Fig. 7 is a sectional plan taken on line 7—7 of Fig. 2 and shows clearly the tops of the lower chucks or moulds and the apron shielding the under mechanism for the parings.

Fig. 8 is a sectional plan taken on line 8—8 of Fig. 2 and clearly shows the mechanism and arrangement of parts on this plane.

Fig. 9 is a detail of one of the lower cam rollers and blocks for lifting and controlling the lower chucks or moulds and is taken on line 9—9 of Figs. 2 and 10.

Fig. 10 is a vertical sectional detail taken on line 10—10 of Fig. 9 and shows the inner structure and arrangement of the cam roller connections.

Fig. 11 is a vertical sectional detail taken on line 11—11 of Fig. 8 and shows the structural arrangement of the lower spindle at this point.

Fig. 12 is a detail of one of the lower chucks or moulds with a pear in position and supported by the form carried by the chuck.

Fig. 13 is a detail similar to Fig. 12 but with the addition of the upper chuck and the halving knife in their normal operative positions during the peeling of the lower portion of the pear.

Fig. 14 is a detail similar to 13 but with the halving knife in its lowermost position after having halved the pear and showing the relative positions of the knife during other stages of operation, in dotted lines.

Fig. 15 is a detail of one of the lower chucks showing the hinge arrangement for tilting the chuck to discharge the finished fruit. In this view the operation of tilting the chuck is at the beginning of its stroke.

Fig. 16 is a companion view to 15 and shows the completion of the chuck tilting movement with the fruit about to drop out of the chuck into a suitable receptacle, which receptacle shows at the top of Fig. 7.

Fig. 17 is a similar view to 15 but with the chuck turned 90 degrees to clearly show this view of the hinge construction.

Fig. 18 is a plan of one of the lower chucks illustrating the manner in which the mould body is formed to produce cutting edges for effecting the peeling of the pears when the moulds are rotated.

Like figures of reference throughout the several views of the drawings indicate like parts in all of the views.

This invention as embodied in the structure shown in the accompanying drawings comprises a base member 1, having a central hub 2, in which is secured against rotation a vertically disposed pivot shaft 3, on which shaft is mounted practically all of the main moving parts of the machine.

Mounted directly on the top of the base member 1 is a fixed cam member 4, designed to control and operate the series of lower chucks comprising a part of the operative mechanism of the machine.

Mounted directly over the cam member 4 and connected therewith is an annular member 5, carrying in turn a gear segment 6, Fig. 8, said annular member and said gear segment being fixed against rotation.

A sleeve 7, is rotatably mounted on the pivot shaft 3 and carries turret members 8 and 9. The member 8 is mounted so as to rotate directly over the fixed member 5 carrying the gear segment 6 and has disposed around its periphery a series of hubs 10, each in turn carrying a sleeve spindle 11, while each of said spindles 11 carry pinions 12, which in turn mesh with and are rotated by the gear segment 6 during their travel with the turret 8. Through the centers of the spindle sleeves 11 pass vertically reciprocating rods 13, held in normal operative position by means of the compression springs 14, disposed on the lower ends of said rods. The upper ends of the rods 13 are hingeably connected with the lower mould carriers 15, which are in turn directly hinged to the sleeves 11 as at 16, Figs. 15 and 16. The lower ends of the sleeves 11 carry cam blocks 17, which blocks in turn carry cam rollers 18 riding in the cam member 4.

The upper turret member 9 is provided with a series of hubs 19 disposed around its periphery, each of said hubs in turn carry sleeve shafts 20 carrying on their lower ends the upper mould carriers 21 and on their upper ends the pinions 22.

Figure 4:
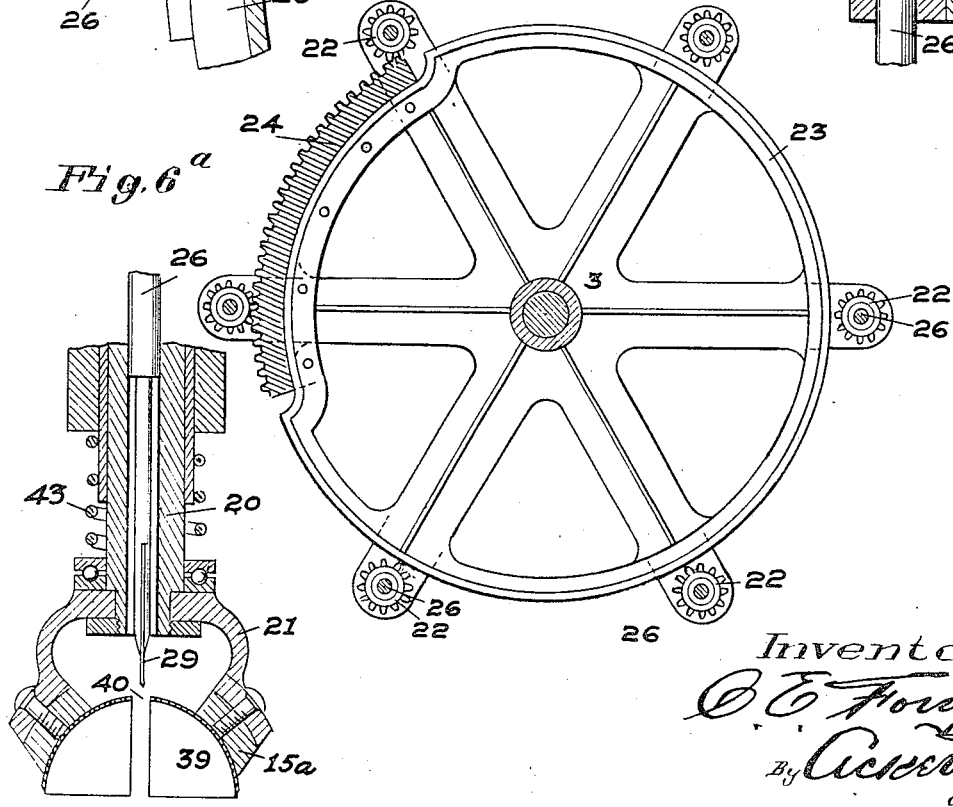
Fig. 4 is a sectional plan taken on line 4—4 of Fig. 2 and clearly shows the operative mechanism on this plane of operation.

Mounted directly above the turret member 9 is a member 23 mounted on the vertical pivot shaft 3 and fixed against rotation. This member 23 carries the gear segment 24, Fig. 4, which gives rotation to the pinions 22 during their travel around their orbit.

Mounted on the extreme upper end of the vertical pivot shaft 3 is a cam member 25 fixed against rotation. Mounted for reciprocation in the sleeves 20 are operating rods 26 carrying on their upper ends the cam blocks 27 and the cam rollers 28 which rollers in turn ride in the cam member 25. The lower ends of the rods 26 carry parting knives 29 which reciprocate through the action of the cam member 25 and act to halve the pears at a certain stage of the operation.

Power is applied to the operative mechanism through the medium of a drive shaft 30 extending through the base member 1. On said shaft 30 is mounted a worm 31 meshing with a worm gear 32. Said worm gear is mounted on a vertical shaft 33 riding in a bearing 34 formed integral with the base member 1. The upper end of the shaft 34 carries a pinion 35 meshing with a gear 36 which is secured to the rotating sleeve 3. A thrust ball bearing carries the load of the rotating mechanism mounted on the sleeve 3 as at 37. The actual power means for driving the machine has been omitted as it may be an ordinary belt from some power source or may be driven in any other manner suitable to conditions existing where the machine is to be used.

The operation of the machine is as follows:—

Figure 1:
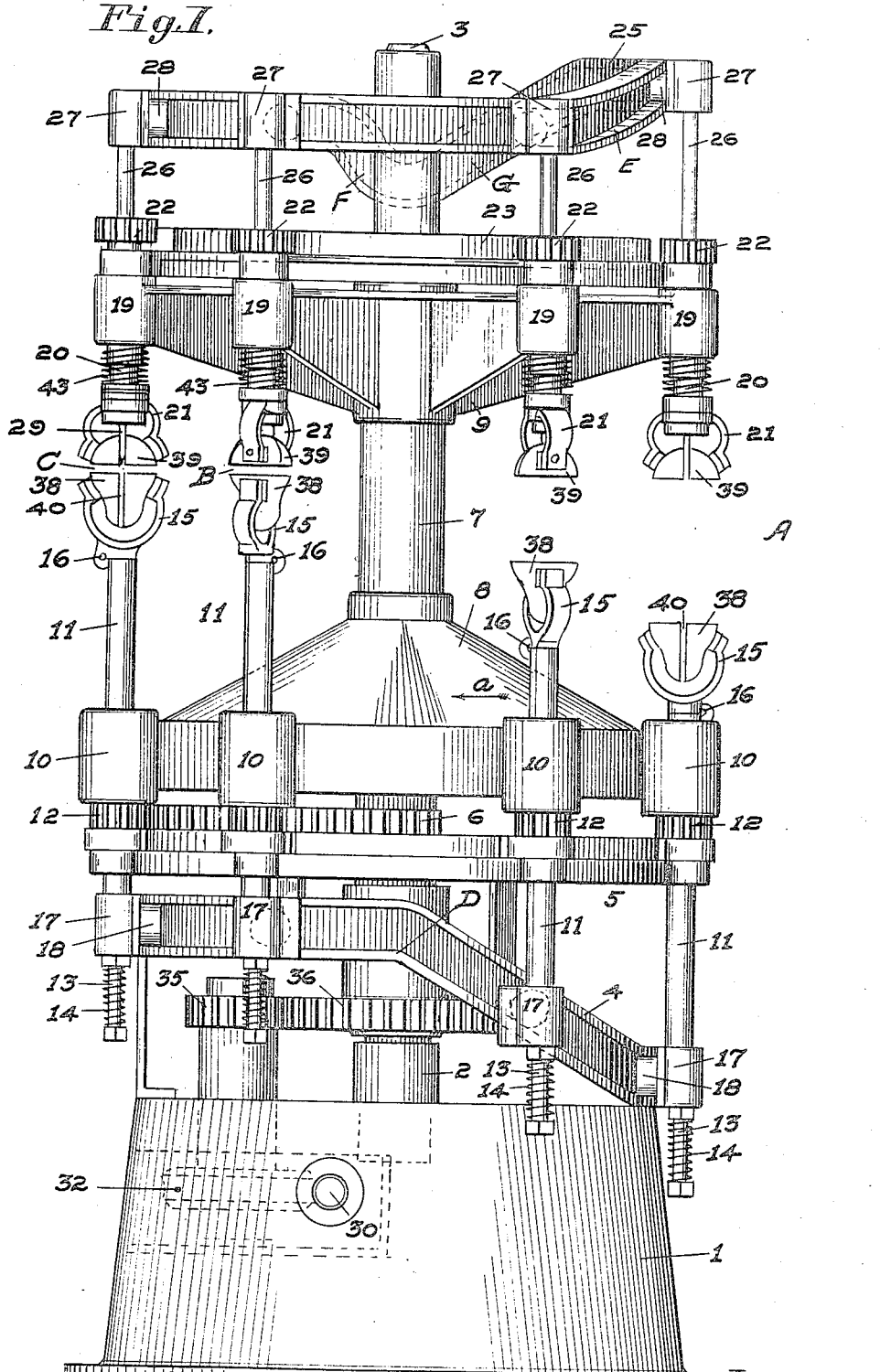
Fig. 1 represents a vertical side elevation of my improved machine as adapted to the peeling of pears and shows the various operative parts in approximately their normal positions.

Pears are selected as to size and placed by hand into the lower cup moulds 38 at the point "A" Fig. 1. At this point the cam member 4 has separated the moulds so that the placing of the pears is easily accomplished while the machine is in motion. It is to be noted here that the machine is continuous in operation and is limited in speed only by the skill of the operator in placing the fruit in the moulds. The machine rotates in the direction of the arrows "a" Figs. 1 and 8.

As soon as the pears are in place the continued rotation of the machine causes the cam rollers 18 riding in the cams 4 to bring the lower moulds 38 into engaging positions as at "B" and "C" Fig. 1, with the upper moulds 39. This position takes place, however, just as the cam rollers 18 reach the point "D" on the cam 4 Fig. 1. Just at this point also the pinions 12 engage with the gear segment 6 and begin to rotate the lower moulds 38 and continue to so rotate them until the pinions pass out of engagement with the segment 6.

By reference to Figs. 1, 2, 6ª and 18 it will be noted that the moulds 38 and 39 are slotted vertically as at 40 for two purposes, one to permit the free passage of the parting knife 29 when it descends to halve the peeled pears and the other to form cutting edges to remove the peeling. By reference to Fig. 18 it will be clearly seen how the cutting edges 41 are disposed, and this is the same for both upper and lower moulds. The cups or moulds 38 rotate in the direction of the arrow and of course the cutting edges 41 being bent inward will engage the pear and remove the peeling. It will be noted by reference to Figs. 4 and 8 that the rotation of the upper and lower moulds is alternate. As the machine rotates from the point "A" Figs. 1 the pinions 12 engage with the gear segment 6 before the pinions 22 engage with the gear segment 24, thus the lower moulds are first rotated and when the lower portion of the pear is peeled the lower moulds cease rotation on account of the pinions passing out of engagement with the segment 6 and the pinions 22 engage with the segment 24 and begin to rotate the upper moulds and peel the upper portion of the pear. Before the rotation of the lower moulds the parting knives 29, through the action of the inclined portion "E" of the cam 25 have entered the pears and are held in the position of Fig. 13 during the entire time that the lower moulds are rotating. The knives 29 thus hold the pears against rotation as the lower mould rotates and cuts the peeling from the lower portion of the pears and continues in this position during the rotation of the upper moulds and hold the pears against rotation during the cutting of the upper portions of the peelings from the pears.

As soon as the pinions 22 pass out of engagement with the gear segment 24 the pears are completely peeled and reshaped and are ready for halving. At approximately this point the cam rollers 28 begin to enter the incline "F" of the cam 25, Figs. 1 and 2 and move the knives 29 down to the positions of Fig. 14, thus completing the operations on the pears. The cam rollers 28 immediately begin to ascend the incline "G" of the cam 25 and thus completely withdraw the knives 29 from within the moulds 39 and at the same time the cam rollers 18 begins to ride in the declining portion "H" of the cam member 4 Fig. 2, and thus draw the halved and peeled pears down away from the upper moulds 39, and as the descent through the portion "H" of the cam 4 continues the lower ends of the stems 13, Figs. 2, 15 and 16 engage a fixed inclined cam member 42 which causes the stems 13 to move upward while the sleeves 11 are moving downward with the result that the lower moulds are tipped as shown in Fig. 16 and the halved pears are discharged into a suitable receptacle, shown in Fig. 7. Aside from some few additional details to be explained this covers the general sequence of operations.

No matter how careful the selection, it would be practically impossible to select pears of more than approximate shape and size, but it is highly desirable if possible, to have the finished product of the same size and shape and the method of procedure forming a part of my invention produces substantially this desirable result.

Ripe pears are more or less plastic and will stand a reasonable amount of pressure without breaking down the cell structure if it is applied uniformly and in a yielding manner. I accomplish just this effect through the manner of operating the upper moulds during the peeling operation.

By reference to Figs. 1, 2 and 6ª it will be observed that the upper moulds are held in normal inoperative position through the medium of the compression springs 43. The sleeve 20 is capable of slight vertical reciprocation against the pressure of the springs 43, this reciprocation coming at the beginning of the peeling of the fruit. The selected fruits are just slightly larger than the moulds 38 and 39 so that when they are first put into the moulds the excess size is accommodated by the slight upward movement of the upper moulds 39, and as the peeling is removed from the lower portion of the pears and they are thereby slightly reduced in size, the compression springs 43 gradually force the upper moulds down and cause the peeled lower portion of the pears to continue filling the lower moulds just as long as the lower moulds are rotating and peripheral portions are being removed, as soon, however, as the lower moulds stop rotating, due to the pinions 12 passing out of engagement with the gear segment 6 the downward movement of the upper moulds ceases until they begin rotating when the removal of the peelings permits the springs 43 to again move them downward until they come to their normal finishing position, which position occurs at approximately the end of the gear segment 24.

It is easily understood by studying this procedure that all pears passing through my improved machine are reshaped and sized so that when they are discharged, each and every pear is of uniform dimension throughout, which is a condition that has not before been attained in the peeling of fruit for canning purposes. It is also seen, how, through the action of the yielding upper moulds, slightly imperfectly shaped pears are brought to a uniform and standard shape.

The pears may be cored before or after passing through the machine, I have found however that they handle rather better if cored after.

It will be noted that the mould carriers 15 and 21 support the moulds by means of spacing blocks 15ª, Fig. 15 and 6ª, thus through the medium of different size block I can have moulds of varying sizes which can be quickly placed in the machine and I am thereby enabled to handle fruits in lots, of varying sizes and shapes, so that one machine is adapted to handle an entire crop of pears by this simple expedient, combined with proper grading for size.

While I have described my invention as applied to a machine for peeling pears it is equally as well adapted to operate on fruits of other kinds provided their structure is firm enough to hold up under the action of the cutting and forming moulds.

I claim:—

1. In a machine for peeling pears, the combination of means for holding pears, said holding means carrying fixed peeling means, with other means for imparting peeling movement to said holding and peeling means.

2. In a machine for peeling pears the combination of means for holding pears, said holding means carrying fixed peeling means, with other means for imparting peeling movement to said holding and peeling means together with means for ejecting said peeling pears from said holding means.

3. In a machine for peeling pears the combination of means for holding pears, said holding means also acting as peeling means, with other means for imparting peeling movement to said holding means in alternate steps with means for holding said pears against rotation.

4. In a machine for peeling pears the combination of means for holding pears, said holding means also acting as peeling means, with means for imparting peeling movement to said holding means and means for halving said peeled pears while in said holding means.

5. In a machine for peeling pears the combination of means for holding pears, said holding means also acting as peeling means, means for imparting peeling movement to said holding means, pear halving means also acting as means for holding said pears against rotation during the peeling thereof.

6. In a machine for peeling pears the combination of means for holding pears, said holding means also acting as peeling means, means for imparting peeling movement to said holding means in alternate steps.

7. In a machine for peeling pears the combination of means for holding pears, said holding means also acting as peeling means, means for imparting peeling movement to a part of said holding means and then imparting peeling movement to another part of said holding means whereby said pears are peeled.

8. In a machine for peeling pears the combination of means for holding pears, said holding means also acting as peeling means, said holding means comprising separable elements, means for imparting peeling movement to said holding means in successive steps.

9. In a machine for peeling pears the combination of means for holding pears, said holding means also acting as peeling means, means for imparting successive independent cycles of peeling movement to said holding means, said holding means comprising axially separable units, with means for moving said units axially.

10. In a machine for peeling pears the combination of means for holding pears, said holding means also acting as peeling means, means for imparting peeling movement to said holding means, pear piercing means for holding said pears against rotation during the peeling period, said holding means comprising axially aligned upper and lower units independently movable in alternation during the peeling operation and axially separable before and after the peeling operation.

11. In a machine for peeling pears comprising means for holding pears, said means being of pear shape and of cup formation and comprising two separate bifurcated portions, one or more cutting edges formed on said bifurcated portions adapted to contact with said pears and remove peripheral portions therefrom, means for imparting movement to said holding means with means for holding said pears against movement during the movement of said holding means while in the act of removing peripheral portions from said pears.

12. In a machine for peeling pears comprising pear holding means composed of axially aligned cup shaped members, said holding means also acting as peeling means, means for imparting relative movement between said pears and said holding means whereby peripheral portions of said pears are removed and said pears are shaped to conform to said holding means.

13. In a machine for peeling pears comprising means for holding pears, said holding means also acting as peeling means, said holding means comprising two axially separable bifurcated portions, pear halving means, moving through said bufurcations, means for imparting peeling movement to said holding means while said pears are held against movement therein by said pear halving means.

14. In a machine for removing peripheral portions from globular articles comprising means for holding globular articles, said holding means also acting as peripheral removing means, means for imparting successive alternate cycles of movement between said globular articles and said holding means, whereby peripheral portions are removed from said globular articles.

15. In a machine for removing peripheral portions and reshaping globular articles comprising separately movable holding means, said holding means also acting as removing means, means for imparting movement to said holding means in successive steps whereby peripheral portions are removed from said globular articles in successive stages, means for engaging said globular articles and holding same against movement while said peripheral portions are being removed.

16. A machine for removing peripheral portions from globular articles comprising a plurality of article holding means mounted for axial rotation and for planetary rotation around a central axis, means for imparting both axial and planetary rotation to said holders, said holders comprised of opositely disposed and axially aligned members adapted to support articles while peripheral portions are removed therefrom, means for imparting movement between said holders and said articles, cooperative means for engaging said articles while in said holders and dividing same into two or more portions.

17. A machine for removing peripheral portions from articles comprising a plurality of article holding means moving continuously through a circular path about a central axis, means for giving continuous movement to said holding means, said holding means composed of axially aligned oppositely disposed members adapted to surround said articles, said holding means being also adapted to remove peripheral portions from said articles while relative movement is established between said holding means and said articles, whereby said articles are reduced in size and made to conform to the shape of said article holding means.

18. A machine for removing the outer coats of globular fruits comprising a series of holding means moving successively through a fixed path, said holding means composed of oppositely disposed units having relative axial movement during their travel through said fixed path, with means for imparting said axial movement, means for imparting intermittent rotary movement to said holding means during each cycle of operation whereby the said outer coats are removed from fruits held by said holding means.

19. A machine for removing outer portions from globular fruits comprising a series of holding means moving in single file procession through a fixed path, means for moving said holding means through said fixed path, means for imparting intermittent axial rotation to each of said holding means during its passage through said fixed path in alternate relation whereby the outer portions of fruits held by said holding means are removed.

20. A machine for removing the outer portions of globular fruits comprising two series of coacting holding means moving through fixed paths, means for imparting movement to said holding means, said holding means being composed of separately operating elements arranged in axial alignment and coacting in pairs, means for imparting alternate rotative movement to each of said elements of a pair, whereby fruit carried by said holders has its outer portions removed in successive stages.

21. A machine for operating on globular articles comprising a rotating turret member carrying a series of article holding units, a second rotating turret member carrying another series of article holding units, said turrets being aligned so that the holding units move together in opposed pairs, means for imparting relative axial movement between said unit pairs during each cycle of operation, and other means for imparting alternate rotary movement to each unit of a pair during each cycle of operation, whereby articles supported by said holding units are operated on in alternate stages.

22. A machine for operating on globular articles comprising a rotating turret member carrying a series of article holding units, a second rotating turret member carrying another series of article holding units, said turrets being aligned so that the holding units move together in opposed pairs, means for imparting relative axial movement between said unit pairs during each cycle of operation, and other means for imparting alternate rotary movement to each unit of a pair during each cycle of operation, whereby articles supported by said holding units are operated on in alternate stages, with separate means for engaging articles while supported by said holding means and holding them against rotation during the alternate rotary movement of said holder units.

23. A machine for operating on globular articles comprising a series of oppositely disposed holding units arranged in pairs on turrets adapted to rotate around a fixed axis, said holding units having relative axial movement, cam means for imparting said axial movement to said holding units through the medium of axially movable spindles located on said turrets and acting as immediate supports for said several holding units, means for imparting alternate rotary movement to each unit of a pair of said holders whereby articles supported by said holding units are operated on in successive stages.

24. A machine for peeling, shaping and resizing pears comprising a series of pairs of pear holding and pear peeling members arranged to move in double file processional order, means for moving said members in said order, means for imparting alternate rotary movement to each member of a pair of holders whereby first one portion of a supported pear is peeled and then the remaining unpeeled portion is peeled, means for engaging each pear separately and holding it against rotation, said means then acting to divide said pear into two or more parts, means for imparting relative axial movement between each pair of holding members whereby the divided pears may be ejected from the machine.

25. A machine for operating on fruits comprising a base member supporting a vertically disposed pivot member, a rotatable sleeve surrounding said pivot member, turret members mounted on said sleeve, fruit holding members mounted on said turrets, means for imparting relative axial movement between said fruit holding members, other means for imparting alternate rotary movement to said holding members, ejecting means carried by each one of a pair of holding members, halving means carried by each one of a pair of holding members all coacting and cooperating to operate on fruit in successive stages with power means for operating the said several elements.

26. A device for preparing fruit for canning purposes comprising a pair of half moulds arranged in axial alignment, means for imparting relative axial movement between said half moulds, means for imparting alternate rotary movement to said half moulds, each of said half moulds having means for removing peripheral portions from fruit supported by said moulds, severing means moving axially within said moulds for dividing fruit contained therein with power means for operating the said several means whereby fruit handled by said device is operated upon in a predetermined manner.

27. A device for preparing fruit for canning purposes comprising a pair of half moulds arranged in axial alignment, one of said half moulds being yieldingly supported, said half moulds being fruit shaped and adapted to remove peripheral portions from fruits held therein by yielding pressure while having relative movement thereto.

28. The method of preparing fruit for canning purposes comprising the following steps, selecting fruit of a nearly uniform size and shape, placing said selected fruit in a fruit shaped half mould, placing another fruit shaped half mould over said first half mould to substantially enclose said fruit, giving alternate rotation to said half moulds whereby peripheral portions are removed from said fruit and it is thereby shaped and sized to conform with said moulds.

29. The method of preparing fruit for canning purposes comprising the following steps, selecting fruit of a nearly uniform size and shape, placing said selected fruit in a fruit shaped half mould, placing another fruit shaped half mould over said first half mould to substantially enclose said fruit, giving alternate rotation to said half moulds whereby peripheral portions are removed from said fruit and it is thereby shaped and sized to conform with said moulds, then moving a dividing knife axially through said half moulds whereby said treated fruit is divided into separate units.

30. The method of preparing fruit for canning purposes comprises the following steps, selecting fruit of a nearly uniform size and shape, placing said selected fruit into a fruit shaped mould, which is adapted to support said fruit and also to remove peripheral portions therefrom, inserting means within said mould to hold said supported fruit from rotary movement, imparting rotary movement to said fruit shaped mould whereby peripheral portions are removed from said fruit whereby it is shaped and sized to conform with said mould, then dividing said fruit into separate units.

In testimony whereof I have signed my name to this specification.

CHARLES E. FORRY.